United States Patent
Auvinet et al.

(10) Patent No.: US 9,399,451 B2
(45) Date of Patent: Jul. 26, 2016

(54) SYSTEM AND METHOD FOR TRACKING THE PATH OF A VEHICLE

(75) Inventors: Jannick Auvinet, Evreux (FR);
Christophe Bouet, Ouistreham (FR);
Bertrand Gruyelle, Vernouillet (FR);
Thierry Philippe, Vernon (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 811 days.

(21) Appl. No.: 13/575,843

(22) PCT Filed: Jan. 20, 2011

(86) PCT No.: PCT/FR2011/050104
§ 371 (c)(1),
(2), (4) Date: Oct. 8, 2012

(87) PCT Pub. No.: WO2011/092415
PCT Pub. Date: Aug. 4, 2011

(65) Prior Publication Data
US 2013/0024048 A1    Jan. 24, 2013

(30) Foreign Application Priority Data
Jan. 29, 2010  (FR) ...................................... 10 50627

(51) Int. Cl.
*B60T 8/1755*  (2006.01)

(52) U.S. Cl.
CPC ......... *B60T 8/17555* (2013.01); *B60T 2250/03* (2013.01); *B60T 2270/86* (2013.01)

(58) Field of Classification Search
CPC ........................... B60W 30/18145; G01L 5/20
USPC .......................................................... 701/70
See application file for complete search history.

(56) References Cited

U.S. PATENT DOCUMENTS

| | | | | |
|---|---|---|---|---|
| 5,002,147 A | * | 3/1991 | Tezuka ................. | B60K 28/165 180/197 |
| 5,699,251 A | * | 12/1997 | Mori ..................... | B60C 23/061 303/163 |

(Continued)

FOREIGN PATENT DOCUMENTS

| DE | 41 11 614 | 10/1992 |
|---|---|---|
| DE | 196 20 584 | 11/1997 |

(Continued)

OTHER PUBLICATIONS

French Search Report Issued Sep. 21, 2010 in FR 1050627 Filed Jan. 29, 2010.

(Continued)

*Primary Examiner* — Thomas G Black
*Assistant Examiner* — Ana Thomas
(74) *Attorney, Agent, or Firm* — Oblon, McClelland, Maier & Neustadt, L.L.P

(57) ABSTRACT

A system for tracking a path of a motor vehicle, the system including: an instantaneous speed sensor on each wheel of front and rear axle systems; a mechanism to calculate speed loss between wheels of a single axle system; a mechanism to calculate difference between the speed losses of each axle system; and a mechanism to compare the difference with a stored threshold value. A method for tracking a path of a motor vehicle includes: calculating speed losses for wheels of front and rear axle systems; calculating speed loss difference between each front and rear axle system; and comparing the speed loss difference with a stored threshold value.

12 Claims, 5 Drawing Sheets

(56) References Cited

U.S. PATENT DOCUMENTS

| | | | |
|---|---|---|---|
| 5,742,917 A * | 4/1998 | Matsuno | B60K 17/3462 180/197 |
| 5,959,202 A * | 9/1999 | Nakajima | B60C 23/061 340/444 |
| 6,003,959 A | 12/1999 | Katayose et al. | |
| 6,059,065 A * | 5/2000 | Takeda | B60K 23/04 180/244 |
| 6,386,308 B1 * | 5/2002 | Takahira | B60T 8/175 180/197 |
| 6,431,663 B1 * | 8/2002 | Fennel | B60T 8/172 303/140 |
| 6,510,372 B1 * | 1/2003 | Zenzen | B60T 8/1766 180/197 |
| 6,584,397 B2 * | 6/2003 | Tanaka | B60T 8/1755 303/140 |
| 6,843,338 B2 * | 1/2005 | Ohtsu | B60K 23/0808 180/233 |
| 7,125,086 B2 * | 10/2006 | Tanaka | B60T 8/1755 303/143 |
| 7,318,629 B1 * | 1/2008 | Sun | B60T 8/1755 303/146 |
| 2002/0065617 A1 * | 5/2002 | Kamiya | B60C 23/061 702/50 |
| 2003/0218378 A1 * | 11/2003 | Tanaka | B60T 8/1755 303/146 |
| 2005/0029862 A1 * | 2/2005 | Kato | B60T 8/1755 303/146 |
| 2005/0103552 A1 * | 5/2005 | Ohno | B60K 23/0808 180/248 |
| 2005/0240332 A1 * | 10/2005 | Mori | B60T 8/1755 701/72 |
| 2006/0052927 A1 * | 3/2006 | Watanabe | B60T 8/17616 701/71 |
| 2006/0071551 A1 * | 4/2006 | Taniguchi | B60T 8/1755 303/146 |
| 2007/0255473 A1 * | 11/2007 | Christofl | B60K 17/3462 701/67 |
| 2009/0127014 A1 * | 5/2009 | Ushiroda | B60K 28/165 180/249 |
| 2009/0192675 A1 * | 7/2009 | Yamakado | B60T 8/1755 701/38 |
| 2009/0261961 A1 * | 10/2009 | Miyamoto | B60C 23/061 340/444 |
| 2011/0035126 A1 * | 2/2011 | Ishikawa | B60W 40/064 701/65 |

FOREIGN PATENT DOCUMENTS

| | | |
|---|---|---|
| DE | 198 16 432 | 10/1998 |
| EP | 0 392 164 | 10/1990 |

OTHER PUBLICATIONS

International Search Report Issued May 19, 2011 in PCT/FR11/50104 Filed Jan. 20, 2011.

* cited by examiner

SYSTEM AND METHOD FOR TRACKING THE PATH OF A VEHICLE

The invention relates to the field of monitoring trajectories of a motor vehicle, and more particularly of the systems and methods for maintaining and correcting the trajectory when a vehicle understeers.

The invention applies to the monitoring of the trajectory of the motor vehicle when it is in a bend and there is a demand for engine torque from the user.

In a bend, if there is a demand for torque on the front axle system, a front-wheel drive vehicle tends to understeer, that is to say that its turning radius is greater than the curve defined by the road. In the case of a rear-wheel drive vehicle, the vehicle tends to oversteer.

It is known practice to control the trajectory of a motor vehicle by monitoring certain physical magnitudes such as the yaw speed, the transverse acceleration, and the drift of the vehicle. These vehicle magnitudes are measured by gyroscopic and/or accelerometric sensors. The measured values are compared with vehicle models that reflect the desire of the driver. As a function of the comparison, the system determines a setpoint for the purpose of reducing this discrepancy. The setpoint is applied to the elements that can generate a variation in the drag on one or more wheels, such as the brakes, the controlled differentials or independent electric motors mounted on each of the wheels.

Therefore patent application FR2893294 describes a motor vehicle stabilization method. This method comprises a step of computing an understeer indicator; the computation is based on the ratio of the setpoint yaw over the measured yaw of the vehicle. The setpoint yaw is, according to the vehicle geometry, the turning angle and the vehicle speed.

Patent application FR2845656 describes a method for reducing the trajectory discrepancy of a motor vehicle. This method comprises a step of evaluating the error based on the acquisition of a steering wheel angle sensor, of an accelerometer measuring the lateral acceleration, of the speed sensors of each of the wheels and of a specific rotation sensor making it possible to evaluate the angle of yaw. The document cites that the method is very ponderous in terms of computation and that it is wise to provide either a powerful computer or a computer dedicated solely to this task.

The drawbacks of the documents presented are the time needed to determine the trajectory discrepancy and the difficulty of refinement because it depends on parameters specific to the vehicle at a given moment (tires, load, position of the center of gravity). These drawbacks involve a margin of error which makes it necessary to cause the systems that reduce the trajectory discrepancy to take very violent action. One drawback emerges from the reading of these documents is the ponderousness of the computations and the management of the memory of the dedicated computer(s) mainly because of the management of the models.

In view of the foregoing, one objective of the invention is to be able to detect rapidly a trajectory discrepancy in acceleration and consequently to be able to correct the discrepancy rapidly in order to perturb the driver as little as possible.

Another objective is to make it possible to apply a setpoint by precisely following the desire of the driver.

In order to achieve the above, a system is proposed for monitoring the trajectory of a motor vehicle comprising an instantaneous speed sensor on each of the wheels of the front and rear axle systems. This system comprises means for computing the speed discrepancy between wheels of one and the same axle system, means for computing the difference between the speed discrepancies of each of the axle systems, and means for comparing this difference with a stored threshold value.

By virtue of this, it is possible to rapidly detect a discrepancy in the trajectory of the vehicle.

Advantageously, the threshold may be determined for a map of vehicle speed and of steering wheel angle in order to effectively determine a discrepancy in trajectory of the vehicle.

According to one variant, the system may comprise means for determining the trajectory of the vehicle as a function of the speed discrepancy of the wheels of the rear axle system or as a function of the sign of the measurement of the angle of the steering wheel of the vehicle.

In one particular embodiment, the system may comprise means for measuring the angle of the steering wheel of the vehicle, means for measuring the engine torque, means for determining the correction setpoint and means for applying the setpoint, said means being capable of applying the setpoint when the measured value of the angle of the steering wheel of the vehicle and of the torque exceed a value. This has the advantage of matching the setpoint to the trajectory and to the power desired by the driver.

The system may comprise means for applying the correction setpoint that are capable of applying the correction setpoint to the inside front wheel of the trajectory.

According to another aspect, a method is also proposed for monitoring the trajectory of a vehicle comprising the steps:
computing the speed discrepancies of the wheels of each of the front and rear axle systems,
computing the difference in the speed discrepancies between each of the front and rear axle systems,
comparing the difference in the speed discrepancies with a stored threshold value.

In one embodiment, the method may comprise a step of determining the setpoint to be applied as a function of a measurement of the angle of the steering wheel of the vehicle and of the engine torque.

As a variant, the method may comprise a step of determining the trajectory of the vehicle as a function of the speed discrepancy of the wheels of the rear axle system or as a function of the sign of the angle of the steering wheel of the vehicle.

According to one variant, the method may comprise a step of applying the correction setpoint to the inside front wheel of the trajectory.

Other features and advantages of the invention will appear on reading the following detailed description of a nonlimiting example. In order to understand it, reference should be made to the following figures.

Figure 1:
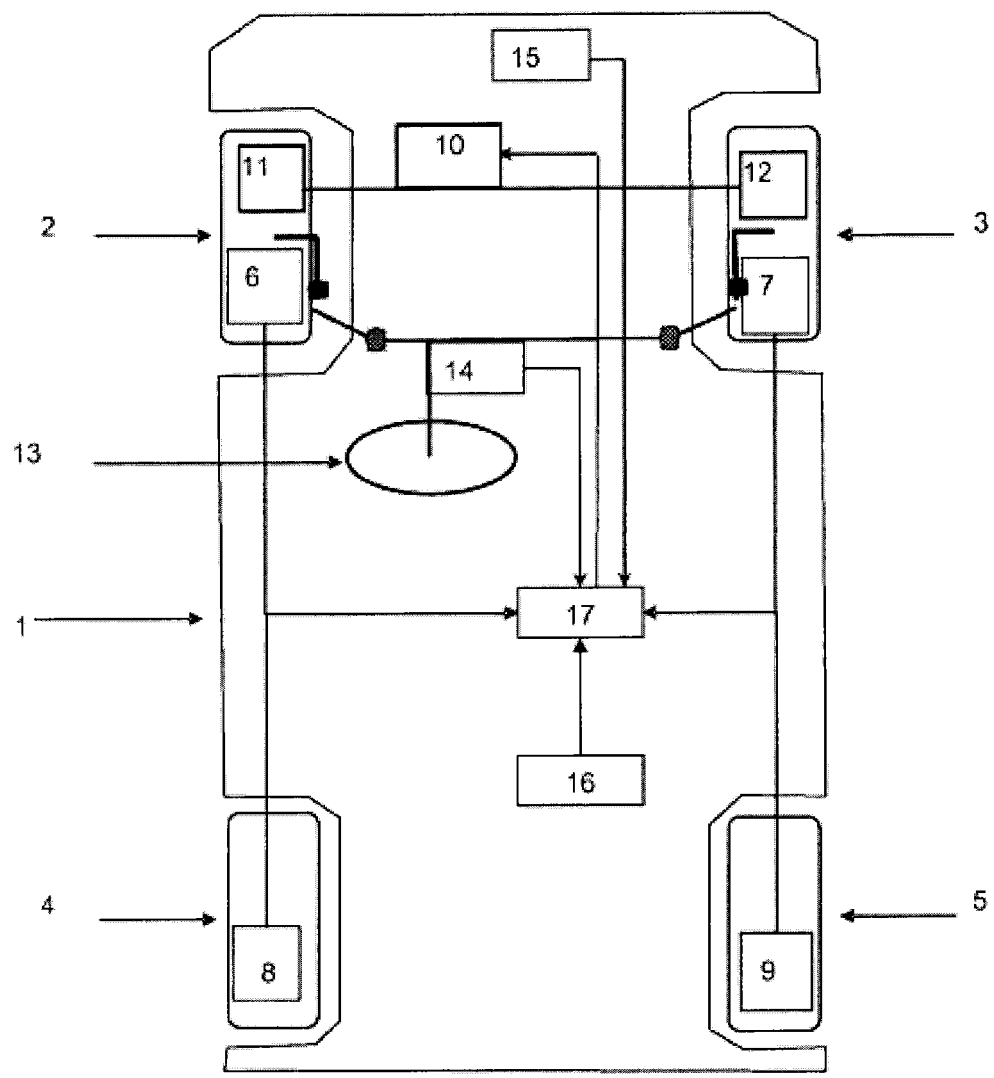
FIG. 1 is a schematic representation of a vehicle according to the invention.

With reference to FIG. 1, a motor vehicle 1, with its traction system driven by an engine (not shown in the figures), comprises four wheels 2 to 5 (left front wheel 2, right front wheel 3, left rear wheel 4 and right rear wheel 5). Each wheel 2 to 5 is fitted respectively with an instantaneous speed sensor 6 to 9 making it possible to measure the speeds $\omega_{avg}$, $\omega_{avd}$, $\omega_{arg}$ and $\omega_{ard}$ of the wheels 2 to 5.

A braking device 10 capable of generating a different braking pressure in the left front brake caliper 11 and right front brake caliper 12, this braking device 10 may, for example, be a device of the ESC (Electronic Stability Control) actuator type. Moreover, the ESC device has the advantage of comprising instantaneous speed sensors on the wheels.

The vehicle 1 comprises a steering wheel 13 acting on a steering control which makes it possible to orient the front wheels 2 and 3. The steering wheel 13 is fitted with a sensor 14 for sensing the angle of the steering wheel 13 making it possible to measure the angle a of the steering wheel 13.

The vehicle 1 also comprises a sensor 15 of the engine torque making it possible to measure the engine torque M and a speed sensor 16 of the vehicle 1 measuring the speed v of the vehicle 1.

The vehicle 1 is fitted with a computer 17 making it possible to monitor and control various devices. The computer 17 may receive via connections data, for example, originating from the speed sensors 6 to 9, from the engine torque sensor 15 and from the sensor 14 of the angle of the steering wheel 13. The computer 17 may also control the braking device 10. The computer 17 also makes it possible to execute the method for controlling the trajectory of the vehicle 1.

Figure 3:
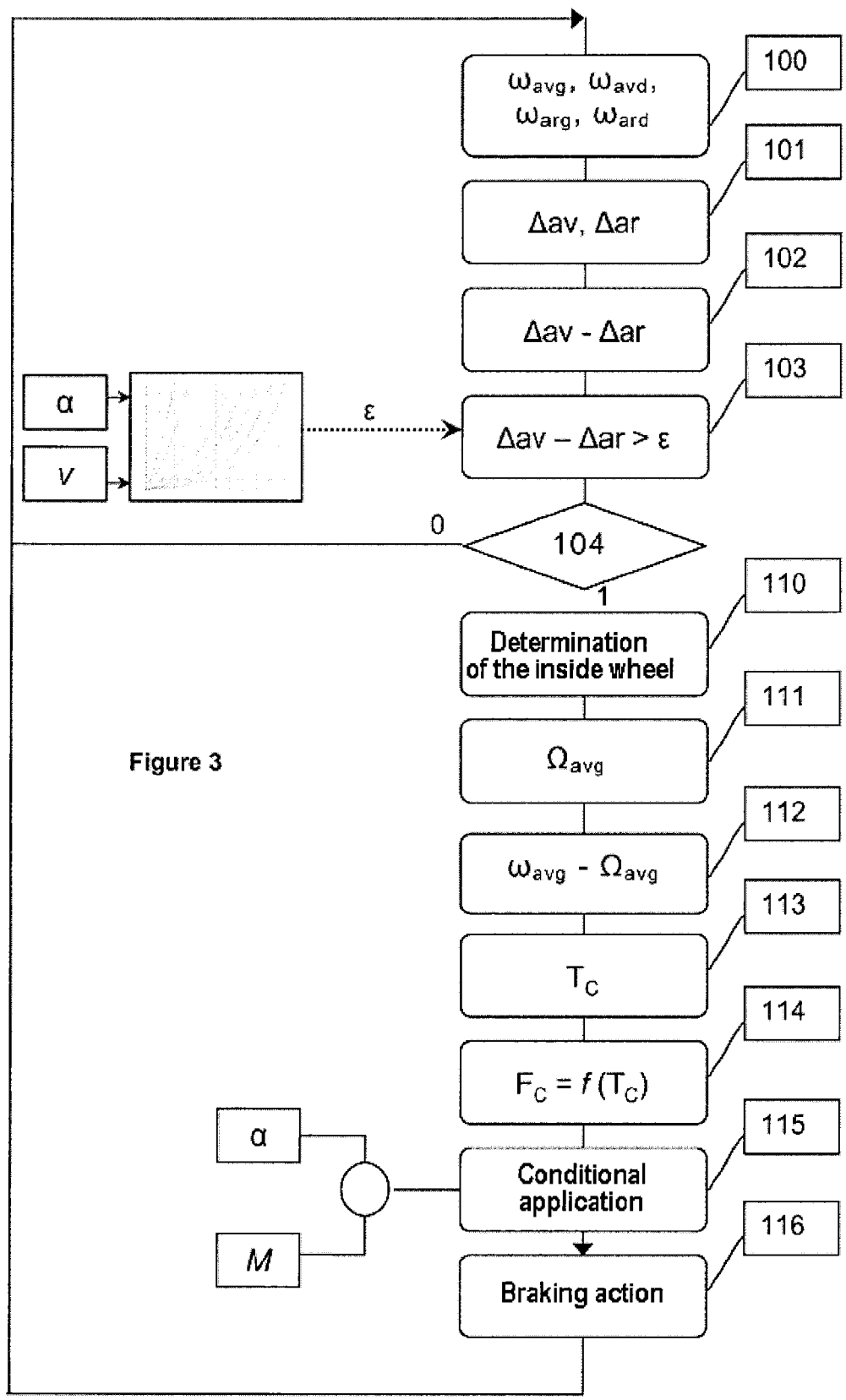
FIG. 3 is a schematic representation of the main steps of a method for detecting and correcting a discrepancy in trajectory in a left bend.

As shown in FIG. 3, the method comprises a step 100 of acquiring the signals of the speed sensors 6 to 9 indexed $\omega_{avg}$, $\omega_{avd}$, $\omega_{arg}$ and $\omega_{ard}$. The method also comprises a step 101 of computing the speed discrepancies of the wheels of the front axle system Aav and rear axle system Aar. In other words, the step 101 makes it possible to compute the speed discrepancy according to the following equations (1) and (2):

$$\text{front axle system } Aav=(\omega_{avd}-\omega_{avg}) \quad (1)$$

$$\text{and rear axle system } Aar=(\omega_{ard}-\omega_{arg}) \quad (2)$$

Then a step 102 makes it possible to compute the difference in the speed discrepancy of the wheels of the front axle system Aav with the speed discrepancy of the wheels of the rear axle system Aar, according to the following equation (3):

$$(\omega_{avd}-\omega_{avg})-(\omega_{ard}-\omega_{arg}) \quad (3)$$

The next step 103 makes it possible to compare the result of the computation of step 102 with a stored threshold value $\epsilon$. The threshold value E may be determined, according to the illustrated example, for a mapping of the angle a of the steering wheel 13 of the vehicle 1 and of engine torque 15 (in dashed lines in the figure).

A step 104 for diagnosing the trajectory of the vehicle 1 takes account of the result of step 103. If $(\omega_{ard}-\omega_{ard})-(\omega_{avg})-(\omega_{ard}-\omega_{arg})<\epsilon$, the method detects no discrepancy in trajectory and sends the value 0 as an output of the comparator which causes the return of the method starting from step 100. In the contrary case, that is to say $(\omega_{avd}-\omega_{avg})-(\omega_{ard}-\omega_{arg})>\epsilon$ which corresponds to a trajectory discrepancy δ, as shown in FIG. 2, the method detects a discrepancy in trajectory and sends the value 1 as an output of the comparator which causes the continuation of the method with a step 110.

Step 110 makes it possible to determine which of the front wheels 2 or 3 is the inside front wheel of the trajectory, for the purpose of controlling the brake caliper that is associated therewith for the correction of the trajectory of the vehicle. The inside front wheel 2 or 3 is the inside front wheel of the trajectory relative to the bend of the vehicle 1, in other words the inside front wheel is the front wheel traveling the least distance in the bend. The inside front wheel 2 or 3 is determined by the algebraic value of the speed discrepancy of the wheels of the rear axle system Aar. According to one variant, the inside front wheel 2 or 3 may be determined by the value of the angle a of the steering wheel 13.

Figure 2:
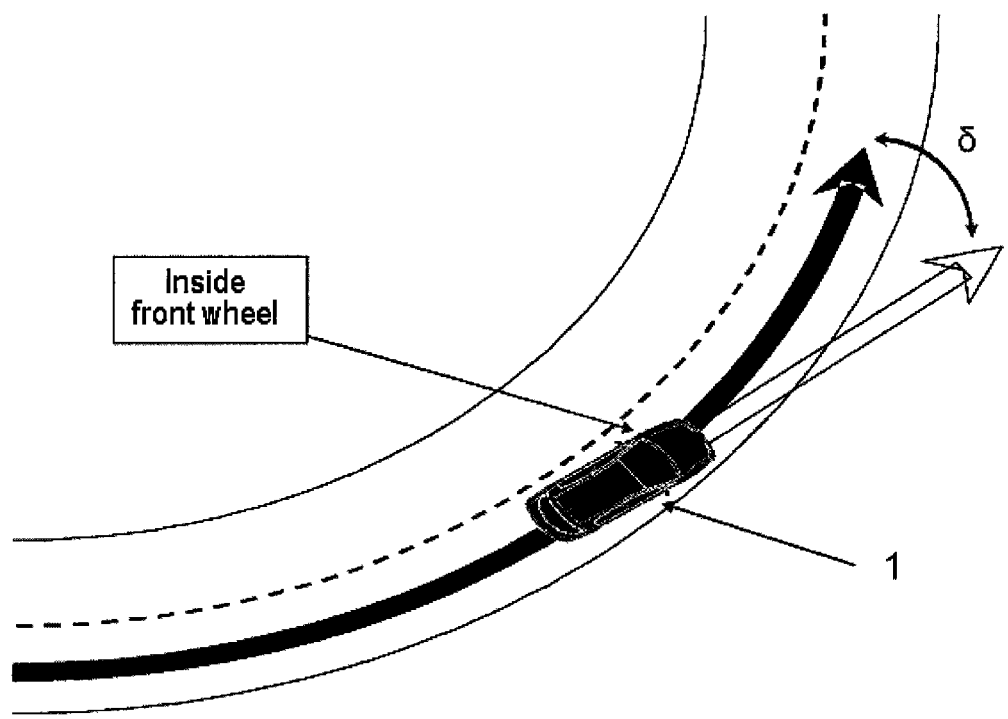
FIG. 2 is a schematic representation of a vehicle that is understeering in a left bend.

In the example illustrated in FIG. 2, the inside front wheel is the left front wheel 2 illustrated in FIG. 1, for the rest of the description the case presented in FIG. 2 will be studied.

A step 111 makes it possible to compute a setpoint speed $\Omega_{avg}$, for the inside front wheel in order to reduce the trajectory discrepancy of the vehicle 1. The purpose of the correction is to have the same difference in speeds of the wheels of the front axle system Aav and of the wheels of the rear axle system Aar. Beginning with this equality, it is possible to deduce therefrom the setpoint speed by the inside front wheel 2 or 3. In the case presented in FIG. 2, the speed à of the inside front wheel 2 is obtained by the equation (4):

Aav=Aar, see equation (1) and (2).

$$\omega_{avd}-\Omega_{avg}=\omega_{ard}-\omega_{arg}$$

$$f\,\text{avg}=\omega_{avd}-(\omega_{ard}-\omega_{arg}) \quad (4)$$

A step 112 makes it possible to compare the setpoint speed $\Omega_{avg}$ with the instantaneous speed of the inside front wheel $\Omega_{avg}$. The comparison means may be, as in the embodiment presented in FIG. 2, the difference between the setpoint speed $\Omega_{avg}$ and the instantaneous speed of the wheel $\omega_{avg}$ but it could have been the ratio of these speeds.

According to the embodiment shown, the method comprises a step 113 of computing a speed correction value $T_c$ that must be applied so that the speed of the left front wheel $\omega_{arg}$ achieves the setpoint speed $\Omega_{avg}$. The correction of the speed $T_c$ which must be provided may be computed, for example, by a proportional integral computation.

A step 114 makes it possible to compute a value of the setpoint $F_c$ to be applied by the system 10 to the brake caliper of the left front wheel 2, as a function of the speed correction $T_c$, according to the following equation (5):

$$F_c=f(T_c) \quad (5)$$

A step 115 allows a conditional application of the setpoint as a function of certain values such as the angle a of the steering wheel 13 and the engine torque M.

A step 116 makes it possible to control the braking system 10 for the value of the setpoint $F_c$ computed in step 114 for the brake caliper of the left front wheel 2.

According to the example illustrated in FIG. 2, the left front wheel is braked, which reduces the speed of the wheel in order to counter the understeer.

If there were a trajectory discrepancy in a right bend, the inside front wheel would have been the right front wheel 3. The method shown in FIG. 3 does not change but it should be noted that the equation (4) of step 111 is written differently. The setpoint speed for the right front wheel 3 is obtained by the equation (6):

$$\Omega_{avd}=\omega_{avg}+(\omega_{ard}-\omega_{arg}) \quad (6)$$

The setpoint is applied by the systems that make it possible to control the speeds of the front wheels. These systems are, in a nonexhaustive manner, the controlled differentials, the brakes and the independent motors. The setpoint boils down to reducing the speed of the inside front wheel either by action of the brakes, or by reducing the torque transmitted to this wheel in the case of independent motors and of controlled differentials.

Figure 4:
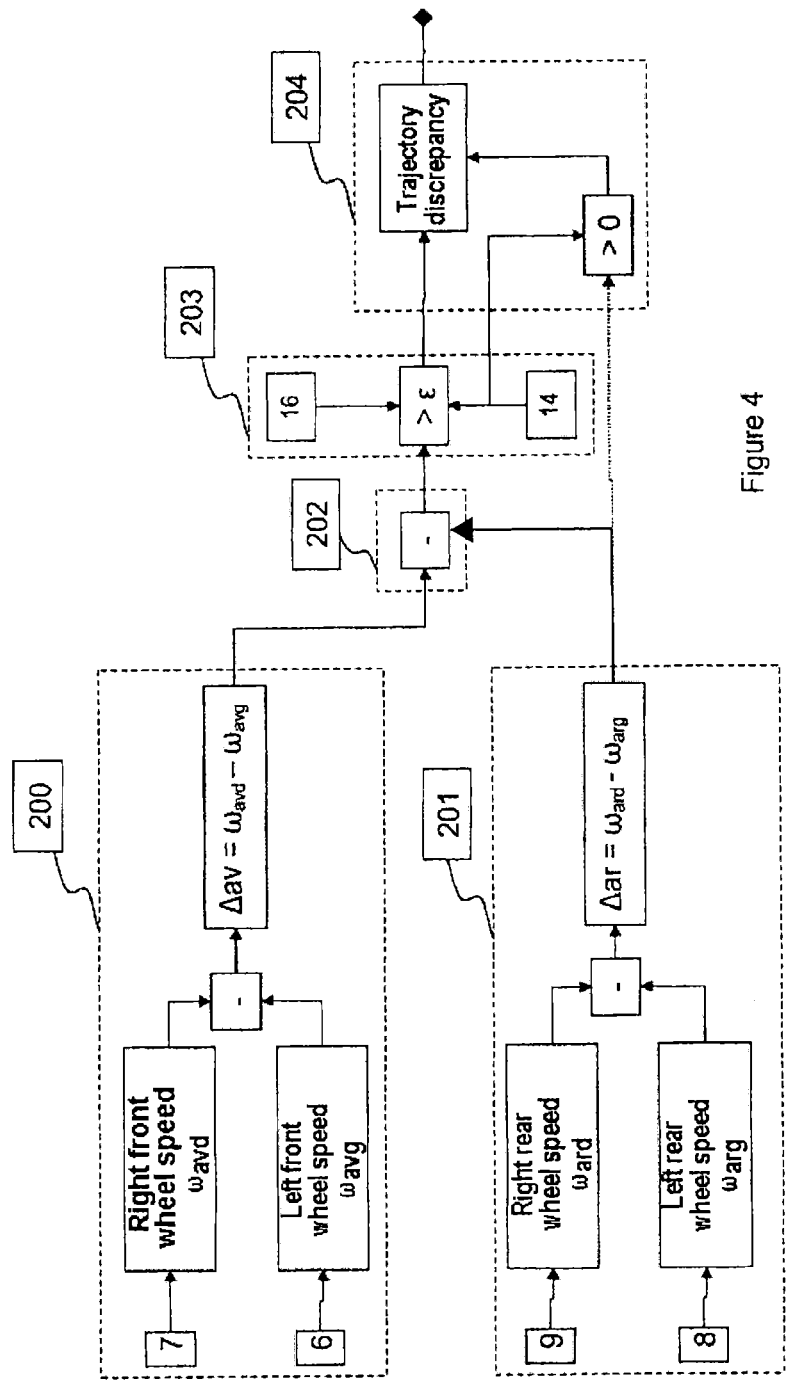
FIG. 4 is a schematic representation of a system for monitoring trajectory.

As shown in FIG. 4, the computer of the system comprises a first means 200 for computing the difference in the wheel speeds of the front axle system Aav based on the signal sent by the speed sensors 6 and 7. A second means 201 for computing the difference in speeds of the wheels of the rear axle system Aar based on the signal sent by the speed sensors 8 and 9.

A third means 202 for computing the difference between the speed discrepancies of each of the axle systems Aav and Aar given by the equation (1) and (2), this third computing means 202 is followed by a comparison means 203 for comparing this difference with a stored threshold value $\epsilon$. The threshold value $\epsilon$ is, according to the embodiment shown, determined according to the angle of the steering wheel a sent by the steering wheel angle sensor 14 and according to the engine torque M sent by the torque sensor 16.

Figure 5:
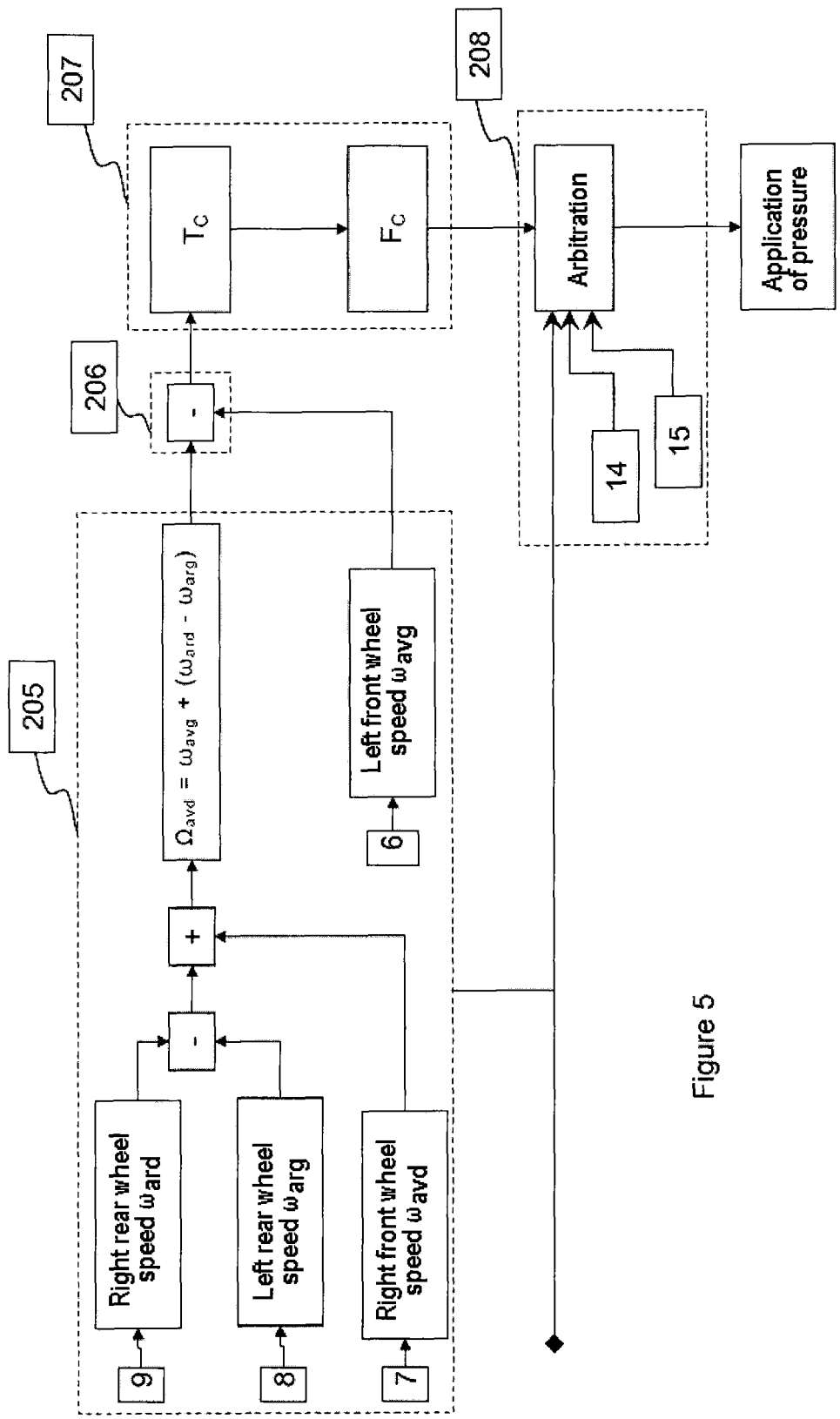
FIG. 5 is a schematic representation of a system for monitoring trajectory during the correction of a discrepancy in trajectory of a vehicle, in a left bend.

A fourth computing means 204 makes it possible to determine whether there is a trajectory discrepancy depending on the result of the third comparison means 203. The fourth means 204 makes it possible, in the event of a trajectory discrepancy, to determine which front wheel is the inside front wheel at the bend defined by the vehicle 1. The fourth means 204 determines the inside front wheel based on the steering wheel angle a or based on the difference of the wheel speeds of the rear axle system Aar in dashed lines in the figure. If the fourth means 204 determines a trajectory discrepancy of the vehicle 1, the fourth means 204 triggers a fifth means 205 for computing a setpoint speed of the inside front wheel shown in FIG. 5.

In the example shown in FIG. 2, the inside front wheel is the left front wheel. The fifth means 205 for computing the setpoint speed takes into account the difference in speeds of the rear wheels Aar and takes into account the speed of the right front wheel $\omega_{avd}$ in order to compute the setpoint speed of the left wheel $\Omega_{avg}$, see equation (6).

A sixth means 206 for comparing the setpoint speed of the left front wheel $\Omega_{avg}$ with the instantaneous speed of the left front wheel $\omega_{avg}$, this comparison may, according to the example illustrated, be the difference between these two speeds.

Then, a seventh means 207 makes it possible, based on the difference between the setpoint speed $\Omega_{avg}$ to be achieved and the instantaneous speed $\omega_{avg}$ of this same wheel, to compute, by a proportional integral computation for example, a correction setpoint of the speed $T_c$ of the inside front wheel to be applied. This speed setpoint $T_c$ is designed to reduce the discrepancy between the setpoint speed $\Omega_{avg}$ and the instantaneous speed $\omega_{avg}$ by means of a pressure applied by the brake caliper of the left front wheel, according to the embodiment shown. The seventh means 207 makes it possible, based on the speed correction setpoint $T_c$, to compute a pressure setpoint $F_c$ to be applied by the braking device 10 to the brake caliper of the left front wheel, according to the example shown.

According to the embodiment shown, the system for monitoring trajectory comprises an eighth means 208 for applying the pressure setpoint if certain parameters exceed a value. These parameters may be, in the case shown, the steering wheel angle a originating from the angle sensor 14, the engine torque M originating from the torque sensor 15 and the trajectory discrepancy of the vehicle originating from the means 204. Taking, notably, as a parameter the value of the trajectory discrepancy makes it possible to limit inappropriate corrections of the system.

According to the embodiment shown, the setpoint speed is reached by virtue of a conventional braking device which actuates the brake caliper on the inside front wheel.

According to another embodiment, the speed of the wheels can be controlled, not with a conventional braking device but for example with a controlled differential which distributes the engine torque to the drive wheels, individual motors providing the mechanical energy necessary to each of the drive wheels or any other means making it possible to control the speed of the wheels.

Systems may seem to provide the same services as the solution proposed by the invention. It is possible to cite mechanical differentials, simulations of mechanical differentials by the brakes, the understeer controls of the trajectory controls (ESC). The solution of the present invention differs from these understeer control system of the ESCs in the fact that the method of the invention acts preventively. The invention described intervenes before this understeer phase is reached and will therefore limit the interventions of the ESC trajectory control systems. The major advantage of the invention is that it allows the rapid detection of trajectory discrepancy.

Another advantage of the invention described is that action is taken progressively and is not disruptive for the driver while the trajectory controls will stop the engine and heavily brake the vehicle in order to slow it down and reduce the understeer. This advantage arises from the application of the speed setpoint to the inside front wheel depending on the speed of the rear wheels.

The invention claimed is:

1. A system for monitoring a trajectory of a motor vehicle comprising:
    an instantaneous speed sensor on each wheel of front and rear axle systems; and
    a computer configured to:
    compute a speed discrepancy between the wheels of the front axle system and a speed discrepancy between the wheels of the rear axle system;
    compute a difference between the speed discrepancies of the front and rear axle systems;
    compare the computed difference between the speed discrepancies of the front and rear axle systems with a stored threshold value; and
    determine the trajectory of the vehicle as a function of the speed discrepancy of the wheels of the rear axle system or as a function of a sign of measurement of an angle of a steering wheel of the motor vehicle.

2. The system as claimed in claim 1, further comprising memory configured to store a mapping of threshold values as a function of the vehicle speed and of the angle of the steering wheel of the motor vehicle.

3. The system as claimed in claim 2, wherein the computer is configured to:
    measure the angle of the steering wheel of the motor vehicle;
    measure engine torque;
    determine a speed correction setpoint; and
    apply the speed correction setpoint, for applying the speed setpoint when the measured value of the angle of the steering wheel of the motor vehicle and of the torque exceed a value.

4. The system as claimed in claim 3, wherein the computer is configured to apply the speed correction setpoint to an inside front wheel of the trajectory.

5. The system as claimed in claim 1, wherein the computer is configured to perform, based on a speed correction value for a determined inside front wheel of the trajectory, either a braking operation to the determined inside front wheel of the trajectory or a reduction in torque transmitted to the determined inside front wheel of the trajectory.

6. A method for monitoring the trajectory of a motor vehicle, comprising:

computing, using a computer, speed discrepancies of wheels of each of a front axle system and a rear axle system;

computing, using the computer, a difference in the speed discrepancies between the front and rear axle systems;

comparing, using the computer, the computed difference in the speed discrepancies of the front and rear axle systems with a stored threshold value; and determining, using the computer, the trajectory of the motor vehicle as a function of the speed discrepancy of the wheels of the rear axle system or as a function of a sign of measurement of an angle of a steering wheel of the motor vehicle.

7. The method as claimed in claim 6, further comprising determining, using the computer, the threshold value as a function of the speed of the motor vehicle and of the angle of the steering wheel of the motor vehicle.

8. The method as claimed in claim 6, further comprising determining, using the computer, the speed setpoint to be applied as a function of a measurement of the angle of the steering wheel of the motor vehicle and of the engine torque.

9. The method as claimed in claim 6, further comprising applying, using the computer, a correction setpoint to an inside front wheel of the trajectory.

10. A system for monitoring a trajectory of a motor vehicle comprising:

a computer that computes a speed discrepancy between the wheels of the front axle system and a speed discrepancy between the wheels of the rear axle system based on speed signals from respective speed sensors associated the wheels, computes a difference between the speed discrepancies of the front and rear axle systems, compares the computed difference between the speed discrepancies of the front and rear axle systems with a stored threshold value, and determines the trajectory of the motor vehicle as a function of the speed discrepancy of the wheels of the rear axle system or as a function of a sign of measurement of an angle of a steering wheel of vehicle.

11. The system as claimed in claim 10, wherein the computer applies a speed correction setpoint to an inside front wheel of the determined trajectory, and performs either a braking operation to the inside front wheel of the determined trajectory or a reduction in torque transmitted to the inside front wheel of the determined trajectory based on the speed correction setpoint.

12. The system as claimed in claim 10, further comprising memory configured to store a mapping of threshold values as a function of the vehicle speed and of the angle of the steering wheel of the motor vehicle.

* * * * *